US006982307B2

(12) United States Patent
Lundquist et al.

(10) Patent No.: US 6,982,307 B2
(45) Date of Patent: Jan. 3, 2006

(54) MATRIX AND PROCESS FOR POLYOLEFIN PRODUCTION

(75) Inventors: Eric G. Lundquist, North Wales, PA (US); Jennifer A. Reichl, St. Davids, PA (US); James C. Bohling, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 15 days.

(21) Appl. No.: 09/932,865

(22) Filed: Aug. 17, 2001

(65) Prior Publication Data

US 2002/0026013 A1 Feb. 28, 2002

Related U.S. Application Data

(60) Provisional application No. 60/226,997, filed on Aug. 22, 2000.

(51) Int. Cl.
*C08F 4/64* (2006.01)
*C08F 4/60* (2006.01)

(52) U.S. Cl. ............... 526/170; 526/74; 526/124.7; 526/160; 526/172; 526/943

(58) Field of Classification Search ............... 502/160, 502/102, 153; 526/74, 124.7, 160, 170, 172, 526/943
See application file for complete search history.

(56) References Cited

U.S. PATENT DOCUMENTS

| 4,127,594 | A | * | 11/1978 | Anderson et al. ............ 549/542 |
|---|---|---|---|---|
| 4,348,509 | A | * | 9/1982 | Sanders et al. ............. 562/538 |
| 4,382,124 | A | | 5/1983 | Meitzner et al. ............. 521/38 |
| 4,808,561 | A | | 2/1989 | Welborn, Jr. ................ 502/104 |
| 4,897,455 | A | | 1/1990 | Welborn, Jr. ................ 526/129 |
| 4,921,825 | A | | 5/1990 | Kioka et al. ................ 502/104 |
| 5,064,802 | A | | 11/1991 | Stevens et al. ............. 502/155 |
| 5,191,052 | A | | 3/1993 | Welborn, Jr. ................ 526/339 |
| 5,198,401 | A | | 3/1993 | Turner et al. ............... 502/155 |
| 5,342,800 | A | | 8/1994 | Jun ........................... 437/52 |
| 5,362,824 | A | | 11/1994 | Furtek et al. ............... 526/114 |
| 5,387,568 | A | | 2/1995 | Ewen et al. ................ 502/104 |
| 5,455,214 | A | | 10/1995 | Furtek et al. ............... 502/109 |
| 5,461,017 | A | | 10/1995 | Furtek et al. ............... 502/109 |
| 5,498,582 | A | | 3/1996 | Krause et al. .............. 502/103 |
| 5,561,092 | A | | 10/1996 | Ewen et al. ................ 502/117 |
| 5,861,352 | A | | 1/1999 | Gila et al. .................. 502/155 |
| 5,866,663 | A | | 2/1999 | Brookhart et al. ........... 526/170 |
| 6,002,035 | A | | 12/1999 | Canteenwala et al. |
| 6,194,343 | B1 | | 2/2001 | Collins et al. |

FOREIGN PATENT DOCUMENTS

| EP | 0 003 071 | | 7/1979 |
|---|---|---|---|
| EP | 0206794 | B1 | 6/1986 |
| EP | 0507876 | B1 | 12/1990 |
| EP | 0563917 | B1 | 3/1993 |
| EP | 0675907 | B1 | 12/1993 |
| EP | 0633272 | B1 | 6/1994 |
| EP | 0677907 | B1 | 4/1995 |
| JP | 8113779 | | 5/1996 |
| WO | WO 91/09882 | | 12/1990 |
| WO | WO 95/15815 | | 12/1994 |
| WO | WO 95/23816 | | 2/1995 |
| WO | WO 96/23010 | | 8/1996 |
| WO | WO 98/30612 | | 1/1998 |
| WO | WO 98/55518 | | 6/1998 |
| WO | WO 00/04059 | | 7/1999 |

OTHER PUBLICATIONS

Matsons et al., CAPLUS AN1999:541980 (1999).*
Reactive & Functional Polymers 36 (1998) 17-30, "The Preparation and Characteristics of poly(divinylbenzene-co-ethylvinylbenzene), including Amberlite XAD-4. Styrenic resins with pendant vinylbenzene groups", K. Lise Hubbard, James A. Finch, Graham D. Darling.
Reactive & Functional Polymers 36 (1998) 1-16, "Polymers with pendant vinyl groups, including poly(divinylbenzene-co-ethylvinylbenzene)", K. Lise Hubbard, James A. Finch, Graham D. Darling.
Chem. Rev. 2000, 100, 1205-1221, "Effect of the Nature of Metallocene Complexes of Group IV Metals on Their Performance in Catalytic Ethylene and Propylene Polymerization", Helmut G. Alt and Alexander Koppl.
Macromolecules 1997, 30 2868-2875, "Quantitative Solid State 13C NMR Studies of Highly Cross-Linked Poly (divinylbenzene) Resins", Robert V. Law, David C. Sherrington, and Colin E. Snape.
Chem. Rev. 200, 100, 1347-1376, "Heterogeneious Single Site Catalysts for Olefin Polymerization", Gregory G. Hlatky.
Journal of Organometallic Chem. 568 (1998) 263-269, "Polymerization Of Ethylene With Metallocene/ Methylaluminoxane Catalysts Supported On Polysiloxane Micro Gels And Silica", Helmut G. Alt, Peter Schertl, and Alexander Köppl.
Book of Abstracts. ACS National Meeting, XX, XX, vol. 526 (Sep. 22, 1999) p. 1, "Supported Metallacences For Olefin Polymerization", Janis G. Matisons, Leanne G. Britcher, and Jarl B. Rosenholm. XP009013883 (abstract).
Annual Meeting of the Phytochemical Society of North America's Symposium on Phenolic Metabolism in Plants, XX, XX, vol. 423, (Aug. 20, 2000), p. 1, "Single Source Polymeric Precursors to Boron-And Zirconium-Modified Silicon Carbide Ceramics", Alexis R. Brunner, Edward E. Remsen, Kai Su, and Larry G. Sneddon. XP009013851 (abstract).
Baukova, et al., "Interaction of Zirconocene Hydrides with Polybutadlene. Synthesis of Zirconium-Containing Polymers", CA, 1993, XP002247752 (abstract).

* cited by examiner

*Primary Examiner*—Caixia Lu
(74) *Attorney, Agent, or Firm*—Stephen E. Johnson

(57) ABSTRACT

Olefin-based materials react with a range of catalysts and catalytic systems to form catalytic matrices, which are employed in the production of a variety of polyolefin products.

7 Claims, No Drawings

MATRIX AND PROCESS FOR POLYOLEFIN PRODUCTION

CROSS REFERENCE TO RELATED PATENT APPLICATIONS

This is a non-provisional application of prior U.S. provisional application Ser. No. 60/226,997 filed Aug. 22, 2000 now abandoned.

The present invention relates to catalytic olefin polymerization and processes for the preparation of a broad range of catalyst systems and a variety of polyolefin products.

BACKGROUND OF INVENTION

Commercial catalytic processes for the production of polyolefins, such as polyethylene and polypropylene, have traditionally relied on the use of heterogeneous, Ziegler-Natta catalyst systems. Typical catalyst systems for polyethylene are exemplified by Chromium compositions supported on silica and Titanium compositions on $MgCl_2$. Although the catalyst systems are quite active and can produce high molecular weight polymers, they tend to produce a broad molecular weight distribution of a particular polyolefin and are poor at incorporating alpha-olefins such as 1-hexene and 1-octene. When making copolymers of ethylene, these catalysts typically produce resins of moderately broad to very broad molecular weight distribution, as characterized by MWD values greater than 6. Lack of a narrow molecular weight distribution in such catalyst systems is believed due to the presense of more than one type of catalytic site.

More recently, olefin polymerization catalyst systems containing well defined reactive sites have been developed. So-called "Single-site catalysts" allow for the production of polymers with varied molecular weights, narrow molecular weight distributions and the ability to incorporate large amounts of comonomers. Metallocene catalysts based on Group 3–6 metals of the Periodic Table (IUPAC nomenclature) containing cyclopentadienyl groups and transition metal catalysts based on Group 3–10 metals of the Periodic Table (IUPAC nomenclature) containing bi- or tridentate ligands are examples of these active single-site catalysts. Such catalysts have been disclosed in U.S. Pat. Nos. 5,064,802; 5,198,401; 5,342,800; 5,866,663 and publications WO 96/23010; WO 98/30612.

The mechanism of olefin polymerization using the above mentioned catalysts has been the subject of much study and is believed to involve generation of an unsaturated, electron deficient metal species, which coordinates olefins to form intermediate alkyl olefin complexes, then subsequently undergoes rapid alkyl migration to afford a growing polymer chain. Olefin coordination followed by migration (insertion) continues until a termination step occurs or the reaction is stopped.

Several methods are currently employed to generate and stabilize the unsaturated electron deficient metal catalysts of such systems. The activation of transition metal complexes to afford stabilized, unsaturated transition metal catalysts for the polymerization of olefins is a key part of this mechanism. Several methods are currently employed to generate and stabilize the unsaturated, electron deficient metal catalysts of such systems and include halide abstraction, protonation followed by reductive elimination, or oxidation. A key element of the activation process is the stabilization of the resulting activated complex using non-coordinating anions. For example, halide containing transition metal complexes can be activated using methylalumoxane (MAO). MAO serves as both a methylating agent and as a non-coordinating anion. Other activating components of utility containing boron include silver tetraphenyl borate, triphenylcarbenium tetrakis(pentafluorophenyl) borate, tri(pentafluorophenyl) boron, N,N-dimethylanilinium tetra(pentafluorophenyl) borate and sodium tetrakis[3,5-bis(trifluoromethyl)-phenyl] borate. Catalyst systems using such activators have been disclosed in U.S. Pat. Nos. 4,808,561; 4,897,455; 4,921,825; 5,191,052; 5,198,401; 5,387,568; 5,455,214; 5,461,017; 5,362,824; 5,498,582; 5,561,092; 5,861,352 and publications WO 91/09882; EP0206794B1; EP0507876B1; WO 95/15815; WO 95/23816; EP0563917B1; EP0633272A1; EP0633272B1; EP0675907B1; JP96-113779; EP0677907B1; WO 98/55518; WO 00/04059.

The greatest utility of single-site catalyst systems to the polyolefin industry is realized when they are used in gas phase and slurry phase reactors. Inorganic oxides such as silica, alumina and magnesia currently have the greatest utility as a support material in the formulation of supported Ziegler-Natta polyolefin catalyst systems. The inorganic supports have also been used with varying degrees of success in supporting metallocene and other types of single-site metal catalysts. A significant limitation of such supports, however, is the presence of surface hydroxyl groups, which render the metallocene catalysts inactive. To overcome this effect large quantities of MAO are used with varying degrees of success coupled with high costs associated using MAO as a support material. Polymeric supports, such as cross-linked polystyrene (PS) have been investigated as supports, since they contain no catalyst deactivating or "poisoning" groups. Methods to chemically anchor metallocene and other single-site metal catalysts to supports have also been developed. The most common methods involve tethering the single-site metal catlyst through a substituent on the cyclopentadlenyl ring, through the boron atom of non-coordinating borate activators, through a substituent on the bridge of ansa-metallocene catalysts or through the heteroatom in mono-cyclopentadienyl complexes.

Given the problems associated with broad molecular weight distributions of polyolefins produced using Ziegler-Natta catalysts, it is desirable to develop a composition incorporating such catalysts that provides polyolefins having relatively narrow molecular weight distributions, comparable to production of the same polyolefins obtained using more expensive and less utilized single-site catalysts. A composition for the production of a range of polyolefins comprising a material that reacts with a variety of olefin polymerization catalysts forming and stabilizes or activates the catalysts, in addition to merely supporting the catalyst, is desirable. There are no reports of a single material that can react with many of the catalyst systems, generally known in the art and used in the production of polyolefins. An olefin-based material has been discovered that reacts with a variety of olefin polymerization catalysts, forming a composition for the production of a range of polyolefins, that stabilizes or activates the catalysts in addition to merely supporting the catalyst. The olefin-based material has utility with commercial developed polyolefin catalyts, such as single-site catalysts and Ziegler-Natta type catalysts. A general process for the production of polyolefins using a matrix that comprises a broad range of polyolefin catalyst systems, that provides uniform dispersal of the catalyst, that stabilizes and activates the catalyst in the process would, therefore, be of great utility; global economic advantage and strategic value to the commercial manufacture of polyolefins.

SUMMARY OF INVENTION

Accordingly, the present invention provides a novel composition for olefin polymerization. An olefin-based, catalytic matrix is disclosed, which can be usefully employed for olefin polymerization. In addition, the matrix may comprise at least one type of activator component or may comprise a combination of catalytic components. The matrix facilitates production of polyolefins and affords polymer products having improved morphology, as the final polymer product is manufactured in shapes that mimick the shapes of the initial heterogenized catalyst. A general process is disclosed for incorporating a range of Ziegler-Natta catalysts and single-site catalysts within the matrix, which have utility in the subsequent production of specific polyolefin products.

It has been discovered that materials containing a plurality of olefin groups react with a variety of olefin polymerization catalysts forming a catalytic matrix, which can be usefully employed for the subsequent production of polyolefins. The olefin-based materials comprise organic and inorganic materials having covalently bound olefin groups or inorganic/organic materials functionalized with olefin groups. The organic materials are in the form of solids or liquids and are based on polymeric materials. The olefin-based materials usefully employed for the polymerization of olefins are macroporous organic polymeric materials prepared by suspension or emulsion polymerization. The number of olefin groups, the pore size and surface area in the polymeric materials can be synthetically and morphologically controlled by judicious selection of polymerization conditions. It has been further discovered that the polymeric materials and their resulting matrices can be prepared in shapes which are useful in the production of polyolefins. Alternatively, the olefin-based materials can be coated onto substrates allowing for the formation of matrices useful for coating objects with polyolefins. Another type of olefin-based materials usefully employed for the polymerization of olefins are inorganic solids and hybrid organic-inorganic polymers, such as siloxanes, that are chemically functionalized with olefin groups. The olefin groups may be disposed on surfaces of the materials or may be dispersed throughout the materials.

The catalytic component of the matrix usefully employed in the present invention are Ziegler-Natta catalysts and single-site catalysts.

The Ziegler-Natta based catalysts usefully employed in accordance with the present invention are exemplified by, but not limited to conventional Titanium (Ti/Mg) and Chromium (Cr/SiO$_2$) based catalysts.

The catalytic matrices usefully employed in accordance with the present invention are exemplified by compositions represented by the following formulas:

$[Cp^1Cp^2MR_xL]^+$ $[NCA]^-$ wherein M is a Group 4 metal, $Cp^1$ is a substituted or non-substituted cyclopentadienyl ring and $Cp^2$ is the same or different, substituted or non-substituted cyclopentadienyl ring and may be bridged symmetrically or asymmetrically to $Cp^1$. R is hydride, alkyl, silyl, germyl or an aryl group, wherein x is an integer equal to 0 or 1. L is an olefin-based material. NCA is a non-coordinating anion.

$[Cp\text{-}R^1\text{-}\mu\text{-}N_R\text{-}\mu\text{-}MR^2_xL]^+$ $[NCA]^-$ wherein M is a Group 4 or 6 metal, Cp is a substituted or non-substituted cyclopentadienyl ring bridging to nitrogen group ($N_R$) via a carbon or silicon group ($R^1$); $R^2$ is a hydride, alkyl, silyl, germyl or an aryl group attached to the metal, wherein x is an integer equal to 0 or 1. L is an olefin-based material. NCA is a non-coordinating anion.

$[Cp^1MR_xL]^+$ $[NCA]^-$ wherein M is a Group 4 or 6 metal, $Cp^1$ is a substituted or non-substituted cyclopentadienyl ring, R is a hydride, alkyl, silyl, germyl or an aryl group, wherein x is an integer ranging from 0 to 6. L is an olefin-based material. NCA is a non-coordinating anion.

[(Multidentate) $MR_xL]^+$ $[NCA]^-$ wherein M is a Group 4 or 6 or 8 or 9 or 10 metal, R is hydride, alkyl, silyl, germyl, aryl, halide or alkoxide group; x is an integer equal to 0, 1 or 2; multidenate is a bidentate, tridentate or tetradentate ligand containing nitrogen, sulfur, phosphorus and/or oxygen as coordinating atoms to the metal. L is an olefin-based material. NCA is a non-coordinating anion.

(Multidentate) $MR_xL$ wherein M is a Group 4 or 6 or 8 or 9 or 10 metal, R is hydride, alkyl, silyl, germyl, aryl, halide or alkoxide group; x is an integer equal to 0, 1 or 2; multidenate is a bidentate, tridentate or tetradentate ligand containing nitrogen, sulfur, phosphorus and/or oxygen as coordinating atoms to the metal. L is an olefin-based material.

Lanthanide or actinide catalysts are also usefully employed in accordance with the present invention and are exemplified, yet not limited to:

$(Cp^1)_x(Cp^2)_yMR_xL+[NCA]$, wherein M is a lanthanide or an actinide metal, R is hydride, alkyl, silyl, germyl, aryl, halide, alkoxide, amide or solvent ligand, R may also be a bidentate ligand containing nitrogen, sulfur, phosphorus and/or oxygen, x=0–2, y=0–2, L is an olefin based material. NCA is a non-coordinating anion.

The present invention also provides a general process for the production of specific polyolefins by judicious selection of the choice of catalyst and olefin-based material. The process comprises polymerizing olefins such as ethylene or propylene alone or in the presence of higher α-olefins, diolefins or cycloolefins in the presence of the matrix decribed above. Combinations of the above catalysts within the matrix have utility in accordance with process of the present invention.

The advantages of the invention are obtained in the ability of the olefin-based materials to react with commercially important olefin polymerization catalysts, the resulting matrices having utility in the polymerization of a range of polyolefins. The reaction of the olefin-based materials with the olefin polymerization catalysts has additional advantages, namely, stabilizing, activating and supporting the catalysts.

The advantages of the matrix of the present invention and the scope of its utility in the above mentioned processes are presented in the detailed description of the invention.

DETAILED DESCRIPTION OF THE INVENTION

The present invention is directed to a matrix for the polymerization of olefins, the matix formed by reaction of an olefin-based material and a catalytic component. The matrix has utility in a general catalytic process for polymerization of olefins. In particular, the process of catalytically converting ethylene to higher molecular weight polyethylene homopolymers, such as high density polyethylene (HDPE) and linear low density polyethylene (LLDPE), and copolymers with alpha-olefins such as 1-butene, 1-hexene and 1-octene. The polymers are intended for processing into articles of manufacture by extrusion, injection molding, thermoforming, rotational molding, hot melt processing and related techniques. In addition, the polyolefins of the present invention are homopolymers of ethylene and propylene, copolymers of ethylene and propylene with higher alpha-olefins or diolefins, and stereoregular polymers of propylene.

In accordance with the present invention, polyolefins can be prepared from olefin monomers using a matrix in a catalytic process with olefin monomers such as unbranched aliphatic olefins having from 2 to 12 carbon atoms, branched aliphatic olefins having from 4 to 12 carbon atoms, unbranched and branched aliphatic α-olefins having from 2 to 12 carbon atoms, conjugated olefins having 4 to 12 carbon atoms, aromatic olefins having from 8 to 20 carbons, unbranched and branched cycloolefins having 3 to 12 carbon atoms, unbranched and branched acetylenes having 2 to 12 carbon atoms, and combinations thereof. Also in accordance with the invention, olefin monomer further comprises polar olefin monomers having from 2 to 60 carbon atoms and at least one atom such as O, N, B, Al, S, P, Si, F, Cl, Br and combinations thereof.

In particular, the olefin monomer is ethylene, propene, 1-butene, 1-hexene, butadiene, 1,6-hexadiene, styrene, alpha-methylstyrene, cyclopentene, cyclohexene, cyclohexadiene, norbornene, norbornadiene, cyclooctadiene, divinylbenzene, trivinylbenzene, acetylene, diacetylene, alkynylbenzene, dialkynylbenzene, ethylene/1-butene, ethylene/isopropene, ethylene/1-hexene, ethylene/1-octene, ethylene/propene, ethylene/cyclopentene, ethylene/cyclohexene, ethylene/butadiene, ethylene/1,6-hexadiene, ethylene/styrene, ethylene/acetylene, propene/1-butene, propene/styrene, propene/butadiene, propylene/1-hexene, propene/acetylene, ethylene/propene/1-butene, ethylene/propene/1-hexene, ethylene/propene/1-octene, and various combinations thereof.

In one embodiment, the matrix of the present invention can be usefully employed with many catalysts exhibiting high activities in ethylene homopolymerization and copolymerization of ethylene/higher α-olefins, allowing the synthesis of ethylene homopolymers and copolymers with narrow molecular weight distributions and/or homogeneous branching distributions. The HDPE and LLDPE resins prepared are intended for use in the production of films with relatively high impact strength and clarity, the fabrication into articles and useful objects by extrusion, injection molding, thermoforming, rotational molding, holt melt processing, the processing of polyethylenes having monodisperse, inorganic particulate additives or modifiers and the processing of coated surfaces, articles and useful objects using polymers comprising ethylene.

An embodiment illustrative of the general utility of the matrix is the production of polyethylene. All three classes of the polyethylene (PE), namely high density polyethylene (HDPE), low density polyethylene (LDPE) and linear low density polyethylene (LLDPE), all of which require a different catalyst systems currently, can be prepared using the matrix of the present invention. HDPE is a linear, semi-crystalline ethylene homopolymer prepared using Ziegler-Natta and Chromium based polymerization methods. LLDPE is a random copolymer of ethylene and α-olefins (such as 1-butene, 1-hexene or 1-octene) prepared commercially using Ziegler-Natta, Chromium based or metallocene based catalysts. LDPE is a branched ethylene homopolymer prepared commercially using a high temperature and high pressure process. HDPE, LDPE and LLDPE can all be prepared by reacting the matrix of the present invention with their respective metal based catalyst or catalyst system.

Another embodiment illustrative of the general utility of the matrix is the production of copolymers of ethylene and higher alpha-olefins. When making polymers, Ziegler-Natta catalysts typically produce polyethylene resins of moderately broad to very broad molecular weight distribution, as characterized by MWD values greater than 6. Broad molecular weight distributions in such catalyst systems is believed due to inhomogeneous catalytic sites. By reacting an olefin based material with a Ziegler-Natta catalyst and forming such a matrix, the polymerization of ethylene can lead to narrower molecular weight distributions, as characterized by MWD values less than 6.

In the process of the present invention, olefins such as ethylene or propylene either alone or together with higher alpha-olefins, having 3 or more carbons atoms, is polymerized in the presence of a matrix comprising reacting an olefin-based material and at least one olefin polymerization catalyst.

In accordance with the invention, one can also produce olefin copolymers of ethylene and higher alpha-olefins having 3–20 carbon atoms. Comonomer content can be controlled through selection of the catalyst component and the olefin-based material.

Olefin-Based Materials

The olefin-based materials usefully employed in accordance with the invention comprise organic materials having covalently bound olefin groups and inorganic materials functionalized with olefin groups. The organic materials are in the form of solids or liquids and are preferably polymeric solids. The olefin-based materials most usefully employed for the polymerization of olefins are macroporous organic polymeric materials such as those prepared by suspension or emulsion polymerization in the presence of porogens. The number of olefin groups, the pore size and surface area in the polymeric materials can be synthetically and morphologically controlled by judicious selection of polymerization conditions. It has been further discovered that the polymeric materials and their resulting matrices can be prepared in shapes which are useful in the production of polyolefins. Another type of olefin-based materials usefully employed for the polymerization of olefins are inorganic solids and hybrid organic-inorganic polymers, such as siloxanes, that are chemically functionalized with olefin groups. The olefin groups may be disposed on surfaces of the solids or may be dispersed throughout the solids. The olefinic groups can either be introduced synthetically or are residual olefinic groups remaining after polymerization.

An embodiment of an olefin-based material in accordance with the present invention involves introducing olefinic groups into silica or other inorganic oxides by reacting surface hydroxyl groups with olefin-containing chlorosilane compounds such as $(CH_3)_2ClSi(vinyl)$, $(CH_3)_2ClSi(allyl)$, $Cl_3Si(vinyl)$ or $Cl_3Si(allyl)$ or alkoxy silane compounds such as $(OR)_3Si(vinyl)$ or $(OR)_3Si(allyl)$, where R represents an alkyl group. Another embodiment of the invention involves the introduction of olefinic groups into organic polystyrene (PS) copolymers by using chloromethylation followed by conversion into phosphonium salts and finally into vinyl groups by Wittig vinylation. Other methods to introduce olefinic groups into organic polymers are disclosed in publications by Darling et al, such as React. Funct. Polym.1998, 36(1), 1–16, the contents and reference citations which are herein incorporated by reference.

A further embodiment directed to olefin-based materials of the present invention concerns using olefinic moities in inorganic polymers that result from the condensation polymerization of organosilanes and siloxanes containing vinyl (olefinic) functional groups such as as $(OR)_3Si(vinyl)$ or $(OR)_3Si(allyl)$. Condensation polymerizations of organosiloxane materials to produce porous, spherical beads are disclosed in publications of Unger et al, such as J. Chromatogr. 1976, 125, 115. Yet another embodiment within the scope of the present invention concerns using olefinic moities in organic polymers that result from the polymerization of diolefin monomers in which one olefin group selectively polymerizes. Polydiene polymers, such as polybutadiene and polyisoprene, and copolymers of butadiene and styrene are examples of polymers containing residual unreacted, pendant vinyl (olefinic) groups that have utility as olefinic materials for the metallocene catalysts of the present invention. Other examples of olefin containing materials are disclosed in publications by Darling et al, such as React. Funct. Polym.,1998, 36(1), 1–16, the contents and reference citations which are herein incorporated by reference.

The olefin-based material is selected from the polymer such as divinylbenzene polymers, divinylbenzene copolymers, styrene/divinylbenzene copolymers, divinylbenzene resins, cross-linked divinylbenzene polymers, styrene/butadiene copolymers, styrene/isoprene copolymers, vinylsiloxane polymers and combinations thereof.

According to the most preferred embodiment for the olefin-based material in the present invention, olefin containing polymers are prepared from suspension or emulsion polymerization of commerical grade divinylbenzene (DVB). An unexpected advantage of the invention was discovered in observations made when varying the conditions of the polymerization, the amount of residual pendant vinyl groups can be synthetically and morphologically controlled. The olefin containing polymers produced by the suspension or emulsion polymerization of DVB, are crosslinked and thus insoluble, have spherical structures and can be produced at particle sizes between 2 nm and 1000 microns. In addition, the olefin containing polymers can be made porous by addition of a porogen during the polymerization, further enhancing their utility as a ligand system for the catalytic matrix of the present invention. The amount of porosity, pore diameter and surface area can be controlled by varying the amount and type of porogen used during the polymerization as disclosed in publications of Meitzner et. al., such as those related to U.S. Pat. No. 4,382,124, the contents of which are usefully employed in accordance with the invention. Preferred olefin-based materials are embodied in a polymer or copolymer polymerized from a monomer or mixture of monomers containing at least 4 weight percent (%), based on the total monomer weight, of polyvinyl unsaturated monomer. The olefin containing organic material useful in the preparation of the catalytic matrix of the present invention are preferably polymerized from monomer mixtures containing at least 2% by weight polyvinyl aromatic monomers and more preferaby greater than 20% polyvinylaromatic monomers.

Olefin containing organic material useful in the preparation of the catalyst matrix of the present invention are preferably spherical copolymer beads having particle diameters from 5 nanometers to 1 millimeters (mm), such as are produced by emulsion or suspension polymerization, and preferably possess a surface area greater than 1 $m^2/g$, preferably greater than 10 $m^2/g$ and more preferably greater than 100 $m^2/g$. Although any olefin containing material containing at least 0.01 mmol/g of residual vinyl groups and at least 2% polyvinylaromatic monomer units may be used as part of the catalytic matrix of the present invention, the preferred olefin containing organic materials are macroporous polymer beads of the type described in U.S. Pat. No. 4,382,124, in which porosity is introduced into the copolymer beads by suspension-polymerization in the presence of a porogen (also known as "phase extender" or "precipitant"), that is, a solvent for the monomer but a non-solvent for the polymer.

A typical macroporous polymer bead preparation, for example, may include preparation of a continuous aqueous phase solution containing suspension aids (such as dispersants, protective colloids and buffers) followed by mixing with a monomer mixture containing 2 to 100% polyvinylaromatic monomer, free-radical initiator and 2 to 5 parts porogen (such as toluene, xylenes, ($C_4$–$C_{10}$)-alkanols, ($C_6$–$C_{12}$)-saturated hydrocarbons or polyalkylene glycols) per one part monomer. The mixture of monomers and porogen is then polymerized at elevated temperature and the porogen is subsequently removed from the resulting polymer beads by various means; for example, toluene, xylene and ($C_4$–$C_{10}$) alcohols may be removed by distillation or solvent washing, and polyalkylene glycols by water washing. The resulting macroporous copolymer is then isolated by conventional means, such as dewatering followed by drying.

Suitable polyvinylaromatic monomers that may be used in the preparation of the macroporous copolymers useful in the process of the present invention include, for example, one or more monomer selected from the group consisting of divinylbenzene, 1,3,5-trivinylbenzene, divinyltoluene, divinylnaphthalene, and divinylxylene; it is understood that any of the various positional isomers of each of the aforementioned crosslinkers is suitable; preferably the polyvinylaromatic monomer is divinylbenzene. Preferably the macroporous copolymer comprises 2 to 100%, and more preferably 10 to 80%, polyvinyl aromatic monomer units.

Optionally, aliphatic crosslinking monomers, such as ethyleneglycol diacrylate, ethyleneglycol dimethacrylate, vinyl cyclohexene, butadiene, trimethylolpropane triacrylate, trimethylolpropane trimethacrylate, diethyleneglycol divinyl ether and trivinylcyclohexane, may also be used in addition to the polyvinylaromatic crosslinker.

Suitable monounsaturated vinylaromatic monomers that may be used in the preparation of the macroporous polymers useful in the process of the present invention include, for example, styrene, α-methylstyrene, ($C_1$–$C_4$)alkyl-substituted styrenes and vinylnaphthalene; preferably one or more monounsaturated vinylaromatic monomer is selected from the group consisting of styrene and ($C_1$–$C_4$)alkyl-substituted styrenes. Included among the suitable ($C_1$–$C_4$)alkyl-substituted styrenes are, for example, ethylvinylbenzenes, vinyltoluenes, diethylstyrenes, ethylmethylstyrenes and dimethylstyrenes; it is understood that any of the various positional isomers of each of the aforementioned vinylaromatic monomers is suitable. Preferably the macroporous polymer comprises zero to 98%, and more preferably 20 to 90%, monounsaturated vinylaromatic monomer units.

Optionally, non-aromatic vinyl monomers, such as aliphatic unsaturated monomers, for example, vinyl chloride, acrylonitrile, (meth)acrylic acids and alkyl esters of (meth) acrylic acids may also be used in addition to the vinylaromatic monomer. When used, the nonaromatic vinyl monomers typically comprise as polymerized units, from zero to 20%, preferably from zero to 10%, and more preferably from zero to 5% of the macroporous copolymer, based on the total monomer weight used to form the macroporous polymer.

Suitable macroporous polymers useful as materials for the preparation of the catalytic matrix of the present invention are any macroporous polymers containing some "free" vinyl (olefin) groups. These vinyl groups are residual vinyl groups that were left unreacted (representing less than 100% efficiency of the crosslinker) during the polymerization process used to prepare the macroporous copolymer substrate. Suitable macroporous copolymer substrates comprise greater than 2 weight percent polyvinylaromatic monomer units and have at least 0.01, preferably from 0.1 to 5, and more preferably from 0.1 to 4 mmol/g residual vinyl groups.

Alternative polymerization technologies to produce vinyl (olefinic) containing polymers and copolymers useful in this present invention include but are not limited to emulsion polymerization, solution polymerization, precipitation polymerization, anionic polymerization, seeded polymerization, and condensation polymerizations. Essentially any olefinic, diolefinic or multiolefinic monomer can usefully comprise the catalytic matrix of the present invention. Non limiting examples olefin containing functional groups include vinyl, allyl, alkenyl and alkynyl radicals. Synthetic methods, physical properties and processing of polymers having significant residual double bonds are disclosed U.S. Patent application Ser. No. 09/466,591, the contents of which is herein usefully employed in accordance with the present invention.

Several methods were used to characterize and quantify the amount of olefinic groups contained in the organic and inorganic materials useful in the present invention. These include the use of solid state $^{13}$C NMR (nuclear magnetic resonance) CP/MAS-TOSS (cross polarization magic angle spinning with total sideband suppression) and infrared spectroscopy. Chemical derivitization of olefin groups is yet another method used to quantify the amount of olefinic groups contained in a material. The use of a variety of characterization techniques to quantify the amount of pendent vinyl groups contained in a polydivinylbenzene polymer is disclosed in publications of Law et al, such as Macromolecules 1997,30, 2868–275 and Hubbard et al., React. Funct. Polym. Vol. 36 (1), pages 17–30 (1998).

Catalytic Component

The catalyts usefully employed in accordance with the invention are organometallic compositions of transition metals. The transition metal catalysts preferably are of the Ziegler-Natta type or Phillips type catalysts and more preferably is a single site catalyst, such as a Unipol® type, Insite® or Versipol® type catalyst. The most preferred catalysts are based on organometallic compounds of zirconium, titanium, chromium, vanadium, iron, cobalt, palladium and nickel.

Illustrative, but not limiting examples of bis(cyclopentadienyl) group 4 metal compounds which may be used in the preparation of the catalyst matrix of the present invention are listed below:

dihydrocarbyl-substituted bis(cyclopentadienyl)zirconium compounds such as
bis(cyclopentadienyl)zirconium dimethyl,
bis(cyclopentadienyl)zirconium diethyl,
bis(cyclopentadienyl)zirconium dipropyl,
bis(cyclopentadienyl)zirconium dibutyl,
bis(cyclopentadienyl)zirconium diphenyl,
bis(cyclopentadienyl)zirconium dineopentyl,
bis(cyclopentadienyl)zirconium di(m-tolyl).
bis(cyclopentadienyl)zirconium di(p-tolyl)
and chemically/structurally related compounds;

dihydrido-substituted bis(cyclopentadienyl)zirconium compounds such as
bis(cyclopentadienyl)zirconium dihydride
and chemically/structurally related compounds;

hydrido halide-substituted bis(cyclopentadienyl)zirconium compounds such as
bis(cyclopentadienyl)zirconium hydrido chloride
and chemically/structurally related compounds;

hydrocarbyl hydride-substituted bis(cyclopentadienyl)zirconium compounds such as
bis(cyclopentadienyl)zirconium methyl hydride
bis(pentamethylcyclopentadienyl)zirconium (phenyl)(hydride),
bis(pentamethylcyclopentadienyl)zirconium (methyl)(hydride) and
and chemically/structurally related compounds;

(monohydrocarbyl-substituted cyclopentadienyl)zirconium compounds such as
(methylcyclopentadienyl)(cyclopentadienyl)zirconium dimethyl
bis(methylcyclopentadienyl)zirconium dimethyl
bis(dibutylcyclopentadienyl)zirconium dimethyl
and chemically/structurally related compounds;

(polyhydrocarbyl-substituted-cyclopentadienyl)zirconium compounds such as
(dimethylcyclopentadienyl)(cyclopentadienyl)zirconium dimethyl
bis(dimethylcyclopentadienyl)zirconium dimethyl,
bis(pentamethylcyclopentadienyl)zirconium dimethyl,
and chemically/structurally related compounds;

(bridged-cyclopentadienyl)zirconium compounds such as
methylene bis(cyclopentadienyl)zirconium dimethyl,
methylene bis(cyclopentadienyl)zirconium dihydride,
ethylene bis(cyclopentadienyl)zirconium dimethyl,
dimethylsilylbis(cyclopentadienyl)zirconium dimethyl,
ethylenebis(cyclopentadienyl)zirconium dihydride
dimethylsilyl bis(cyclopentadienyl)zirconium dihydride
and chemically/structurally related compounds;

chiral and $C_2$-symmetry compounds; asymetrically bridged-dicylopentadienyl compounds such as
methylene(cyclopentadienyl)(1-fluorenyl)zirconium dimethyl,
dimethysilyl(cyclopentadienyl)(1-fluorenyl)zirconium dihydride,
isopropyl(cyclopentadienyl)(1-fluorenyl)zirconium dimethyl,
isopropyl(cyclopentadienyl)1-octahydrofluorenyl)zirconium dimethyl,
dimethylsil(methylcyclopentadienyl)(1-fluorenyl)zirconium dihydride,
methylene(cyclopentadienyl(tetramethylcyclopentadienyl) zirconium dimethyl
and chemically/structurally related compounds;

racemic and meso isomers of symmetrically bridged substituted dicyclopentadienyl compounds such as
ethylenebis(indenyl)zirconium dimethyl,
dimethylsilylbis(indenyl)zirconium dimethyl,
ethylenebis(tetrahydroindenyl)zirconium dimethyl,
dimetbylsilylbis(3-trimethylsilylcyclopentadientyl)zirconium dihydride and the like;

zirconacycles such as
bis(pentamethylcyclopentadienyl)zirconacyclobutane,
bis(pentamethylcyclopentadienyl)zirconacyclopentane,
bis(cyclopentadienyl)zirconaindane,
1-bis(cyclopentadienyl)zircona-3-dimethylsila-cyclobutane and the like;

olefin, diolefin and aryne ligand substituted bis(cyclopentadienyl)zirconium compounds such as
bis(cyclopentadienyl)(1,3-butadiene)zirconium,
bis(cyclopentadienyl)(2,3-dimethyl-1,3butadiene)zirconium,
bis(pentamethylcyclopentadienyl)(benzyne)zirconium
and chemically/structurally related compounds;

bis(cyclopentadienyl)zirconium compounds in which a substituent on the cyclopentadienyl radical is bound to the metal such as
(pentamethylcyclopentadienyl)(tetramethylcyclopentadienylmethylne)zirconium
hydride, (pentamethylcyclopentadienyl) (tetramethylcyclopentadienylmethylne)zirconium phenyl
and chemically/structurally related compounds.

Illustrative, but not limiting examples of bis(cyclopentadienyl)hafnium and bis(cyclopentadienyl)titanium compounds that usefully comprise the catalytic matrix of the present invention are disclosed in publications of Alt and Koeppl, such as Chem. Rev., 100, 1205–1222, 2000 and Hlatky, Chem. Rev., 100, 1347–1376, 2000, the contents of which are usefully employed in accordance with the invention. Chemically and structurally related bis(cyclopentadienyl)hafnium compounds and bis(cyclopentadienyl)titanium compounds as well as other catalysts of Group 4 metals that are useful in the catalytic matrix of the present invention would be apparent to those skilled in the art based on their respective chemical structures and reactivities in olefin polymerizations.

Illustrative, but not limiting examples of Group 4 and 6 compounds containing a cyclopentadienyl ring bridging to a nitrogen group via a carbon or silicon group which may be used in the preparation of the catalytic matrix of the present invention include:
dimethylsilycyclopentadienyl-tertbutylamido zirconium dimethyl
dimethylsilycyclopentadienyl-tertbutylamido titanium dimethyl
dimethylsilytetramethylcyclopentadienyl-tertbutylamido zirconium dimethyl
dimethylsilytertbutylcyclopentadienyl-tertbutylamido zirconium dimethyl
dimethylsilytetramethylcyclopentadienyl-tertbutylamido titanium dimethyl
dimethylsilytertbutylcyclopentadienyl-tertbutylamido titanium dimethyl
dimethylsilytetramethylcyclopentadienyl-tertbutylamido hafnium dimethyl
dimethylsilytertbutylcyclopentadienyl-tertbutylamido hafnium dimethyl
dimethylsilytetramethylcyclopentadienyl-tertbutylamido zirconium dimethyl
ethylenetetramethylcyclopentadienyldimethylamino chromium dimethyl Illustrative but not limiting examples of Group 4 or 6 metal complexes containing bidentate, tridentate or other multidentate ligands that usefully comprise the catalytic matrix of the present invention include:

bis[N-(3-t-butylsalicylidene)phenylaminato]zirconium dichloride

Illustrative but not limiting examples of Group 8–10 metal complexes containing bidentate, tridentate or other multidentate ligands that usefully comprise the catalytic matrix of the present invention are disclosed in publications of Ittel and Brookhart, such as Chem. Rev., 100, 1169–1203, 2000, Hlatky, Chem. Rev., 100, 1347–1376, 2000, and Gibson, Angew. Chem. Int. Ed. 38, 428–447 the contents of which are usefully employed in accordance with the present invention. A list of preferred of Group 8–10 catalysts that usefully comprise the catalytic matrix of the present invention are:

$\{(2,6\text{-iPr}_2C_6H_3)\text{—N}=C(H)\text{—}C(H)=N\text{-}(2,6\text{-iPr}_2C_6H_3)\}$ NiBr$_2$
$\{(2,6\text{-iPr}_2C_6H_3)\text{—N}=C(Me)\text{-}C(Me)=N\text{-}(2,6\text{-iPr}_2C_6H_3)\}$ NiBr$_2$
$\{(2,6\text{-iPr}_2C_6H_3)\text{—N}=C(Ph)\text{-}C(Ph)=N\text{-}(2,6\text{-iPr}_2C_6H_3)\}$ NiBr2
$\{(2,6\text{-Me}_2C_6H_3)\text{—N}=C(H)\text{—}C(H)=N\text{-}(2,6\text{-Me}_2C_6H_3)\}$ NiBr2
$\{(2,6\text{-Me}_2C_6H_3)\text{—N}=C(Me)\text{-}C(Me)=N\text{-}(2,6\text{-Me}_2C_6H_3)\}$ NiBr$_2$
$\{(2,6\text{-Me}_2C_6H_3)\text{—N}=C(Ph)\text{-}C(Ph)=N\text{-}(2,6\text{-Me}_2C_6H_3)\}$ NiBr$_2$
$\{(2,6\text{-iPr}_2C_6H_3)\text{—N}=C(H)\text{—}C(H)=N\text{-}(2,6\text{-iPr}_2C_6H_3)\}$Pd(Cl)Me
$[\{(2,6\text{-iPr}_2C_6H_3)\text{—N}=C(Me)\text{-}C(Me)=N\text{-}(2,6\text{-iPr}_2C_6H_3)\}$ PdMe(NC-Me)]+
$[\{(2,6\text{-iPr}_2C_6H_3)\text{—N}=C(Ph)\text{-}C(Ph)=N\text{-}(2,6\text{-iPr}_2C_6H_3)\}$ PdMe(NC-Me)]+
$[\{(2,6\text{-iPr}_2C_6H_3)\text{—N}=C(H)\text{—}C(H)=N\text{-}(2,6\text{-iPr}_2C_6H_3)\}$ PdMe(NC-Me)]+
$[\{(2,6\text{-iPr}_2C_6H_3)\text{—N}=C(Me)\text{-}C(Me)=N\text{-}(2,6\text{-iPr}_2C_6H_3)\}$ PdMe(NC-Me)]+
$[\{(2,6\text{-iPr}_2C_6H_3)\text{—N}=C(Ph)\text{-}C(Ph)=N\text{-}(2,6\text{-iPr}_2C_6H_3)\}$ PdMe(NC-Me)]+
$[\{(2,6\text{-iPr}_2C_6H_3)\text{—N}=C(Me)\text{-}C(Me)=N\text{-}(2,6\text{-iPr}_2C_6H_3)\}$ NiMe(OEt$_2$)]+
$[\{(2,6\text{-iPr}_2C_6H_3)\text{—N}=C(Ph)\text{-}C(Ph)=N\text{-}(2,6\text{-iPr}_2C_6H_3)\}$ NiMe(OEt$_2$)]+
$\{[(2,6\text{-PhN}=C(CH_3))_2C_5H_3N]CoCl_2\}$
$\{[(2,6\text{-PhN}=C(CH_3))_2C_5H_3N]FeCl_2\}$
$\{[(2,6\text{-PhN}=C(CH_3))_2C_5H_3N]CoCl_3\}$
$\{[(2,6\text{-PhN}=C(CH_3))_2C_5H_3N]FeCl_3\}$
bis(2,2'-bipyridyl) iron diethyl Chemically and structurally related catalytically active Iron, Cobalt, Nickel and Palladium compounds as well as other catalysts of Group 8–10 metals that are useful in the catalytic matrix of the present invention would be apparent to those skilled in the art based on their respective chemical structures and reactivities in olefin polymerizations.

Activator Components

Illustrative, but not limiting examples of activators that usefully comprise the catalyst matrix of the present invention are disclosed in publications of Chen and Marks, such as Chem. Rev., 100, 1391–1434, 2000, Coates, such as Chem. Rev., 100, 1223–1252, 2000, Resconi et al, such as Chem. Rev., 100, 1253–1346, 2000, Fink et al, such as Chem. Rev., 100, 1377–1390, 2000 Alt and Koeppl, such as Chem. Rev., 100, 1205–1222, 2000 and Hlatky, Chem. Rev., 100, 1347–1376, 2000, the contents of which are usefully employed in accordance with the invention. Activators usefully comprising the catalyst matrix of the present invention are:

Boron containing activators derived from organic or inorganic borane compounds or borate anions, aluminum compounds derived from aluminum alkyls, organoaluminoxanes (e.g. MAO). Prefered examples of activators employed in the catalyst matrix of the present invention are trifluoroborane, triphenylborane, Tris(4-fluorophenyl)borane, Tris(3,5- difluorophenyl)borane, Tris(4-fluoromethylphenyl)borane, Tris(pentafluorophenyl)borane, Tris(tolyl)borane, Tris(3,5-dimethylphenyl)borane, Tris(3,5-difluorophenyl)borane, Tris(3,4,5-trifluorophenyl)borane, Dimethylanilinium (pentafluorophenyl) borate, sodium[B{3,5-$(CF_3)_2C_6F_3$}$_4$], [H(OEt)$_1$ [B{3,5-$(CF_3)_2C_6F_3$}$_4$], aluminum alkyls such as Al($C_2H_5$)$_3$, Al($CH_2CH(CH_3)_2$)$_3$, Al($C_3H_7$)$_3$, Al(($CH_2$)$_3$$CH_3$)$_3$, Al(($CH_2$)$_5CH_3$)$_3$, Al($C_6F_5$)$_3$, Al($C_2H_5$)$_2$Cl, Al$_2$($C_2H_5$)$_3$Cl$_2$, AlCl$_3$ and aluminoxanes such as methylaluminoxane (MAO), modified methyl aluminoxane (MMAO), iobutylaluminoxane, butylaluminoxane, heptylaluminoxane and methylbutylaluminoxane. Both stoichiometric and non-stoichiometric quantities of activators are usefully employed in the catalyst matrix of the present invention using triaryl carbenium tetraarylborates, N,N-dialkylanilinium salts such as N,N-dimethylanilinium tetra(pentafluorophenyl)borate, N,N-diethylanilinium tetra(phenyl)borate, N,N-2,4,6-pentamethylanilinium tetraphenylborate and chemically related Group 13 compounds; dialkyl ammonium salts such as di(i-propyl)ammonium tetra(pentafluorophenyl)borate, dicyclohexylammonium tetra(phenyl)boron and chemically related Group 13 compounds; triaryl phosphonium salts such as triphenylphosphonium tetraphenylborate, tri(methylphenyl)phosphonium tetra(phenyl)borate, tri(dimethylphenyl)phosphonium tetra(phenyl)borate and chemically related Group 13 compounds. Any complex anions or compounds forming such anions that exhibit an ability to abstract and activate the metal compounds would be within the scope of the catalyst matrix of the present invention. Chemically and structurally related boron compounds and aluminum compounds as well as other catalysts of Group 13 elements that are useful in the catalyst matrix of the present invention would be apparent to those skilled in the art based on their respective chemical structures and activities in olefin polymerizations.

Catalytic Matrix

The catalytic matrix of the present invention is formed by reacting a polyolefin catalyst with the olefin containing material. The unsaturated transition metal complex can be generated using activators before reaction with the olefin material or can be formed in the presence of the olefin material. Evidence for the formation of a new catalyst matrix can be obtained using $^{13}$C NMR or IR spectroscopy in which a substantial reduction in olefin resonance is observed. Elemental analysis and techniques to determine elemental composition such as TOF-SIMS and ESCA can also be used to analyzed the catalyst matrix of the present invention.

Polyolefin Processes

Reactor systems well known in the art, such gas phase reactors, slurry loop reactors and solution phase reactors or combinations of reactors can be usefully employed in accordance with the present invention for polyolefin production using the catalytic matrices described above. Gas phase or slurry loop polymerization reactors are preferred.

In one embodiment, a catalytic matrix is deposited on a subtrate which comprises an organic or inorganic material. The material may be in the form of an object or particulate or comprise the surface of a material. The material is subsequently exposed to olefin monomer to form a polyolefin coating on the material. A coating process comprising depositing the matrix of the present invention on a substrate and polymerizing olefin monomer to produce a polyolefin coated surface, object or particulate can be usefully employed in accordance with the invention. The substrate may comprise an organic polymer or may consist of an inorganic oxide, comprising clays, micas, silicates, metals and non-metal oxides. In another embodiment, a process for preparing a composite of substrate and polyolefin in-situ using the matrix in combination with at least one substrate can be employed in accordance with the invention.

The modification of polyolefin properties in-situ is an important advantage of the catalytic matrices of the present invention. Modification of the properties of polyolefins such as polyethylene and polypropylene are possible using matrices of the invention. The ability of the matrix to be used as a polymer modifier in-situ is a key advantage of the invention as compared to the manner of modifying polymer properties known currently in the art. Mechanical properties, such as resistance to shear forces, rheological properties, such as glass transition temperature or viscosity and other physical properties such as fire retardancy of polyolefins can be modified in specific polyolefins in accordance with the invention. In one embodiment, a process for the production of hydrophobically modified particles as hydrophobically modified inorganic particles can be usefully employed in accordance with the invention. The particles can be in the form of spheres, surfaces and objects in which the catalyst matrix is deposited on the particles and polymerized in the presence of an olefin. Other variations of preparing polyolefin coated objects or modified polyolefins are within the scope of the present invention.

EXPERIMENTAL EXAMPLES

In the following examples, all reagents used are of good commercial quality, unless otherwise indicated, and all percentages and ratios given herein are by weight unless otherwise indicated.

Example 1

An example illustrating the preparation of an organic material containing olefinic groups useful for the preparation of the catalyst matrix of the present invention.

A 2-liter, 4-necked flask was equipped with a condenser, mechanical stirrer, thermocouple and nitrogen inlet, containing an aqueous solution prepared by mixing together 680 g deionized water, 3.4 g methylhydroxyethylcellulose, 0.04 g sodium lauryl sulfate, 2.5 g 50% aqueous sodium hydroxide solution and 2.7 g boric acid. A monomer mixture containing 182 g divinylbenzene (80% purity) 149 g xylene, 179 g methylisobutylcarbinol and 4.5 g benzyol peroxide was added to the mixture. Under a nitrogen atmosphere, the resulting mixture was stirred at 300 rpm to maintain the monomer in discrete droplets and heated to 75° C. over a 1-hour period. The monomers were allowed to polymerize at 75° C. for 10 hours. Xylene and MIBC were removed from the mixture by washing with methanol and the resulting polymer beads were allowed to dry overnight in an oven at 40° C. The olefin containing polymer product had an average particle diameter of 80 microns, a porosity of 1.9 cc/g, a 4V/A pore diameter of 104 angstroms and a surface area of 730 m$^2$/g. The amount of pendant vinyl groups, as determined by solid state $^{13}$C NMR spectroscopy was measured to be approximately 1.8 mmol/g.

Example 2

An example illustrating the preparation of an inorganic material functionalized with olefinic groups useful for the preparation of the catalytic matrix of the present invention. In an argon filled glove box, 0.58 g of Grace Davison 948 silica that had been activated at 200° C. for 2 hours, was mixed with 2 grams of dimethylchlorovinyl silane. This mixture was placed into a glass reactor and sealed and removed from the box. After heating for 3 days the reactor was openned inside of the glove box and the contents filtered and the product washed with 20 ml of toluene and then washed with 2×20 ml of heptane and 0.50 g of product was recovered. Elemental analysis and infared spectroscopy indicated that the product contained 0.9 mmol/g of vinyl groups.

Example 3

Catalytic Matrix A

An example illustrating preparation of a catalytic matrix comprising a specific Group 4 catalyst of the present invention useful for the polymerization and copolymerization of ethylene. All manipulations were performed in a glove box under a dry and inert, argon atmosphere.

To 0.500 g of the olefinic material from Example 1 was added 5 ml of toluene. This material was allowed to swell in toluene for 30 minutes. Next, a dark orange oil produced from the reaction of 0.053 g of biscyclopentadienyl zirconium dimethyl in 2 ml of toluene with 0.145 g of N,N-dimethylanilinium tetra(pentafluorophenyl)borate was added to the toluene swollen olefin containing material. The oil quickly reacted with the material resulting in a light orange product and a colorless toluene solution. After mixing for 45 minutes, the material was filtered and washed with 10 ml of toluene followed by 2×20 ml of dry oxygen free heptane. A beige product resulted from filtration and was dried under vacuum, yielding 0.580 g of catalyst. This product contained a calculated 0.27 mmol of Zr per gram of catalytic matrix.

Example 4

Catalytic Matrix B

The example illustrates the preparation of a catalytic matrix comprising a specific Group 4 catalyst of the present invention, comprising the introduction of a single cyclopentadienyl group bridged to a nitrogen group attached to the metal center, useful for the polymerization and copolymerization of ethylene. All manipulations were performed in a glove box under a dry and inert, argon atmosphere using dry and oxygen free solvents.

To 0.190 of olefinic-based material from Example 1 was added 5 ml of toluene. This material was allowed to swell in toluene for 30 minutes. Next, a dark orange oil produced from the reaction of 0.021 g of [t-Butylamido)(tetramethylcyclopentadienyl)dimethylsilane] titanium dimethyl in 2 ml of toluene with 0.052 g of N,N-dimethylanilinium tetra(pentafluorophenyl)borate was added to the toluene swollen olefin containing material. The oil quickly reacted with the material resulting in a light orange brown product and a colorless toluene solution. After mixing for 45 minutes, the material was filtered and washed with 10 ml of toluene followed by 2×20 ml of dry oxygen free heptane. A beige product resulted from filtration and was dried under vacuum, yielding 0.211 g of catalyst. The product contained a calculated 0.25 mmol of Ti per gram of catalytic matrix.

Example 5

Catalytic Matrix C

An example illustrating preparation of a catalytic matrix comprising a specific Group 4 catalyst of the present invention, comprising the introduction of two substituted cyclopentadieyl rings, useful for the polymerization and copolymerization of ethylene. All manipulations were performed in a glove box under a dry and inert, argon atmosphere.

To 0.200 g of the olefin-based material from Example 1 was added 5 ml of toluene. This material was allowed to swell in toluene for 30 minutes. Next, a dark brown orange oil produced from the reaction of 0.018 g of bismethylcyclopentadienyl zirconium dimethyl in 2 ml of toluene with 0.052 g of N,N-dimethylanilinium tetra(pentafluorophenyl) borate was added to the toluene swollen olefin containing material. The oil quickly reacted with the material resulting in a tan brown orange product and a colorless toluene solution. After mixing for 45 minutes, the material was filtered and washed with 10 ml of toluene followed by 2×20 ml of dry oxygen free heptane. A tan brown product resulted from filtration and was dried under vacuum, yielding 0.191 g of catalytic matrix. The product contained a calculated 0.27 mmol of Zr per gram of catalytic matrix.

Example 6

Catalytic Matrix D

An example illustrating preparation of a catalytic matrix comprising a specific Group 4 catalyst of the present invention comprising the introduction of two substituted cyclopentadienyl rings bridged together useful for the isotactic polymerization of propylene. All manipulations were performed in a glove box under a dry and inert, argon atmosphere.

To 0.150 g of the olefinic material from Example 1 was added 5 ml of toluene. This material was allowed to swell in toluene for 30 minutes. Next, a dark orange oil produced from the reaction of 0.019 g of rac-ethylenebis-(4,5,6,7-tetrahydro-1-indenyl)dimethyl zirconium in 1 ml of toluene with 0.046 g of tritylanilinium tetra(pentaflurophenyl)borate was added to the toluene swollen olefin containing material. The oil quickly reacted with the material resulting in a light orange product and a colorless toluene solution. After mixing for 45 minutes, the material was filtered and washed with 10 ml of toluene followed by 2×20 ml of dry oxygen free heptane. A gray beige product resulted from filtration and was dried under vacuum yielding 0.140 g of catalytic matric. The product contained a calculated 0.25 mmol of Zr per gram of catalytic matrix.

Example 7

Catalytic Matrix E

An example illustrating preparation of a catalytic matrix comprising a specific Group 10 catalyst of the present invention useful for the polymerization and copolymerization of ethylene. All manipulations were performed in a glove box under a dry and inert, argon atmosphere.

To 0.100 g of the olefinic material from Example 1 was added 2 ml of methylene chloride. The material was allowed to swell in methylene chloride for 30 minutes. Next, a filltered orange solution containing 0.019 g of [(2,6-(i-$C_3H_7)_2$ $C_6H_3N$=C($CH_3$)—C($CH_3$)=N(2,6-(i-$C_3H_7)_2$ $C_6H_3$)Pd$CH_3$ Cl and 0.029 Na B[3,5-$C_6H_3$—$(CF_3)_2]_4$ in 2 ml of diethylether was added to the methylene chloride swollen olefin containing material. The orange solution quickly reacted with the material resulting in a pale orange brown product. After 45 minutes, the material was filtered and washed with 10 ml of toluene followed by 2×20 ml of dry oxygen free heptane. The tan product was dried under vacuum yielding 0.089 g of catalytic matrix. This product contained a calculated 0.22 mmol of Pd per gram of catalytic matrix.

Example 8

Catalytic Matrix F

An example illustrating preparation of a catalytic matrix comprising a mixed single-site Group 4 catalyst of the present invention, a catalytic matrix containing a mixture of transition metal catalysts useful for the polymerization and copolymerization of ethylene. All manipulations were performed in a glove box under a water free and inert, argon atmosphere.

To 0.15 g of the olefin-based polymeric material from Example 1 was added 3 ml of toluene. This material was allowed to swell in toluene for 60 minutes. Next, a dark orange oil produced from the reaction of 0.006 g of biscyclopentadienyl zirconium dimethyl in 1 ml of toluene with 0.02 g of N,N-dimethylanilinium tetra(pentaflurophenyl) borate and a dark orange oil produced from the reaction of 0.008 g of [t-Butylamido)(tetramethylcyclopentadienyl)-dimethylsilane] titanium dimethyl in 1 ml of toluene with 0.02 g of N,N-dimethylanilinium tetra(pentafluorophenyl) borate were mixed together and added to the toluene swollen olefin containing material. The orange oil quickly reacted with the material resulting in a light orange product and a colorless toluene solution. After mixing for 45 minutes, the material was filtered and washed with 10 ml of toluene followed by 2×20 ml of dry oxygen free heptane. The beige product was dried under vacuum yielding 0.166 g of catalytic matrix. This product contained a calculated 0.13 mmol of Zr per gram and 0.13 mmol of Ti per gram of catalytic matrix.

Example 9

Catalytic Matrix G

An example illustrating preparation of a multi-site catalytic matrix of the Ziegler-Natta type of the present invention useful for the polymerization and copolymerization of ethylene. All manipulations were performed in a glove box under a water free and inert, argon atmosphere.

To 0.350 g of the olefinic material from Example 1 was added 5 ml of tetrahydrofuran. The material was allowed to swell in tetrahydrofuran for 30 minutes. Next, 0.22 mL of a 2.0M solution of EtMgCl in diethyl ether was added to the swollen olefinic material and the mixture allowed to mix for 3 days. Then 0.07 mL of a neat $TiCl_4$ solution was added and a color change from tan to gray) along with an exothermic reaction were noted. After mixing for 24 hours, the material was filtered and washed with 2×20 ml of dry oxygen free heptane to yield 0.300 g of a gray catalytic matrix.

Example 10

Catalytic Matrix H

An example illustrating preparation of a catalytic matrix of the present invention comprising a specific single-site catalyst, further comprising a single cyclopentadienyl ligand system useful for the polymerization and copolymerization of styrene. All manipulations were performed in a glove box under a water free and inert, argon atmosphere.

To 0.201 g of the olefinic material from Example 1 was added 5 ml of toluene. The material was allowed to swell in toluene for 90 minutes. Next, a dark orange brown oil produced from the reaction of 0.015 g of pentamethylcyclopentadienyl titanium trimethyl in 2 ml of toluene with 0.060 g of trityl tetra(pentafluorophenyl) borate was added to the toluene swollen olefin containing material. The oil quickly reacted with the material resulting in a brown product and a light yellow toluene solution. After mixing for 45 minutes, the material was filtered and washed with 10 ml of toluene followed by 2×20 ml of dry oxygen free heptane to yield 0.225 g of a brown catalytic matrix with a calculated 0.25 mmol Ti per gram of catalytic matrix.

Example 11

Catalytic Matrix I

An example illustrating preparation of a catalytic matrix comprising a specific Group 4 catalyst of the present invention useful for the polymerization and copolymerization of ethylene. All manipulations were performed in a glove box under a dry and inert, argon atmosphere.

To 0.100 g of the olefinic material from Example 2 was added 2 ml of toluene. Next, a dark orange oil produced from the reaction of 0.008 g of biscyclopentadienyl zirconium dimethyl in 1 ml of toluene with 0.024 g of N,N-dimethylanilinium tetra(pentafluorophenyl)borate was added to the toluene swollen olefin containing material. The oil quickly reacted with the material resulting in a light orange product and a colorless toluene solution. After mixing for 45 minutes, the material was filtered and washed with 10 ml of toluene followed by 2×20 ml of dry oxygen free heptane. A beige product resulted from filtration and was dried under vacuum, yielding 0.072 g of catalytic matrix. This product contained a calculated 0.24 mmol of Zr per gram of catalytic matrix.

Example 12

Ethylene Homopolymerization

An example illustrating an ethylene polymerization process using a specific catalytic matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.050 of catalytic matrix A were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by a constant ethylene feed. The reaction was stopped by rapid cooling and venting. Twenty nine grams of spherical polyethylene with a particle size of between 200 and 500 microns was recovered. The polyethylene had a weight average molecular weight of 188,500, a molecular weight distribution of 3.4 and a melting point (DSC-10C/min) of 137° C. The polymerization activity was calculated by dividing the yield of polymer by the total number of millimoles of transition metal catalyst contained in the catalyst charge by the time in hours and by the absolute monomer pressure in atmospheres yielding an activity value of 790 g PE/mmol catalyst-hr-atm.

Example 13

Ethylene Homopolymerization

An example illustrating an ethylene polymerization process using a specific catalytic matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.040 of catalytic matrix B were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The polyethylene had a weight average molecular weight of 924,200 a molecular weight distribution of 4.7 and a melting point (DSC-10C/min) of 141° C.

Example 14

Ethylene Copolymerization

An example illustrating copolymerization of ethylene with 1-hexene using a specific catalytic matrix of the present invention. Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.052 of catalytic matrix B were added to the reactor. The reactor was sealed and removed from the glove box and placed in the 70° C. water bath until 70° C. was attained. The reactor was then charged with 80 psig of ethylene and 5 grams of 1-hexene at 70° C. and the polymerization started. The polymerization was continued for 30 minutes while maintaining the reaction vessel within 5° C. of 70° C. and 80 psig ethylene pressure by constant ethylene feed. The reaction was stopped by rapid cooling and venting. 9.6 grams of spherical polymer were recovered. The polymer had a weight average molecular weight of 233,600, a molecular weight distribution of 4.36 and a melting point (DSC-10° C./min) of 119° C.

Example 15

Ethylene Copolymerization

An example illustrating copolymerization of ethylene with 1-hexene using a specific catalytic matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.050 of catalytic matrix C were added to the reactor. The reactor was sealed and removed from the glove box and placed in the 60° C. water bath until 60° C. was attained. The reactor was then charged with 80 psig of ethylene and 10 grams of 1-hexene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The polymer had a weight average molecular weight of 131,900 a molecular weight distribution of 3.36 and a melting point (DSC-10C/min) of 119.6° C.

Example 16

Ethylene Homopolymerization

An example illustrating the polymerization of ethylene using a specific catalytic matrix of the present invention.

Example 17

Ethylene Homopolymerization

An example illustrating the polymerization of ethylene using a specific catalytic matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.048 of catalytic matrix C were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The polyethylene produced had a melting point (DSC-10° C./min) of 136° C.

Example 18

Ethylene Homopolymerization

An example illustrating the polymerization of ethylene using a specific catalytic matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.050 of catalytic matrix G were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The polyethylene produced had a weight average molecular weight of 757,600, a molecular weight distribution of 3.14 and a melting point (DSC-10° C./min) of 141.5° C.

Example 19

Ethylene Homopolymerization

An example illustrating the polymerization of ethylene using a specific catalytic matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.048 of catalytic matrix F were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The polyethylene produced had a weight average molecular weight of 219,400, a molecular weight distribution of 2.39 and a melting point (DSC-10° C./min) of 136° C.

Example 20

Ethylene Homopolymerization

An example illustrating an ethylene polymerization process using a specific catalytic matrix of the present invention.

Polymerization was performed in the slurry-phase in a 600 mL autoclave reactor equipped with a mechanical stirrer, a thermocouple for temperature monitoring, a water cooling loop for temperature control and a regulated supply of purified ethylene. An external water bath was used for attaining reaction temperature. In a glove box, 300 mL of dry heptane, 1.0 mL of 1M triisobutyl aluminum in hexane as a scavenger and 0.050 of catalytic matrix I were added to the reactor. The reactor was sealed and removed from the glove box and placed in the 60° C. water bath until 60° C. was attained. The reactor was then charged with 80 psig of ethylene at 60° C. and the polymerization started. The polymerization was continued for 30 minutes while maintaining the reaction vessel within 3° C. of 60° C. and 80 psig ethylene pressure by constant ethylene feed. The reaction was stopped by rapid cooling and venting. The polyethylene had a melting point (DSC-10° C./min) of 137° C.

We claim:

1. A porous particulate composition comprising a matrix of one or more catalytic components and at least one polymer having a plurality of covalently bound free olefin groups, wherein the catalyst component is an organometallic complex selected from the group consisting of Group 3–10 metals, non-metals, lanthanide metals, actinide metals and combinations thereof; and wherein the matrix is formed by reaction of the one or more catalytic components and the free olefin groups of the polymer.

2. The composition of claim 1, wherein the at least one polymer having a plurality of covalently bound free olefin groups is a macroporous polymer prepared in the presence of a porogen and is selected from the group consisting of divinylbenzene polymers, divinylbenzene copolymers, styrene/divinylbenzene copolymers, divinylbenzene resins, cross-linked divinylbenzene polymers, styrene/butadiene copolymers, styrene/isoprene copolymers, vinylsiloxane polymers, allylsiloxane polymers, and combinations thereof.

3. The composition of claim 1, wherein the matrix further comprises one or more olefin polymerization catalyst components selected from the group consisting of: Ziegler-Natta catalysts, metallocene complexes of Group 3–10 metals, metallocene complexes of non-metals, metallocene complexes of lanthanide metals, metallocene complexes of actinide metals, single-site catalysts, single-site metallocene catalysts and combinations thereof, and at least one activator component.

4. The composition of claim 1, wherein the matrix is selected from the group of formulas consisting of: $[Cp^1Cp^2MR_xL]^+$ $[NCA]^-$, wherein M is a Group 4 metal, $Cp^1$ is a substituted or non-substituted cyclopentadienyl ring and $Cp^2$ is the same or different, substituted or non-substituted cyclopentadienyl ring and may be bridged symmetrically or asymmetrically to $Cp^1$, R is hydride, alkyl, silyl, germyl or an aryl group, x is an integer equal to 0 or 1, L is formed by reaction of the Group 4 metal complex and the free olefin groups of the polymer and NCA is a non-coordinating anion; $[Cp^1Cp^2MR]^+$ $[NCA]^-$, wherein M is a Group 4 metal, $Cp^1$ is a substituted or non-substituted cyclopentadienyl ring and $Cp^2$ is the same or different, substituted or non-substituted cyclopentadienyl ring and may be bridged symmetrically or asymmetrically to $Cp^1$, R is a hydrocarbyl group formed by reaction of the Group 4 metal complex and the free olefin groups of the polymer and NCA is a non-coordinating anion; $[Cp^1MR_xL]^+$ $[NCA]^-$, wherein M is a Group 4 or 6 metal, $Cp^1$ is a substituted or non-substituted cyclopentadienyl ring, R is a hydride, alkyl, silyl, germyl or an aryl group, x is an integer ranging from 0 to 6, L is formed by reaction of the Group 4 or 6 metal complex and the free olefin groups of the polymer and NCA is a non-coordinating anion; $[(Multidentate)MR_xL]^+$ $[NCA]^-$, wherein M is a Group 4 or 6 or 8 or 9 or 10 metal, R is hydride, alkyl, silyl, germyl, aryl, halide or alkoxide group, x is an integer equal to 0, 1 or 2, multidenate is a bidentate, tridentate or tetradentate ligand containing nitrogen, sulfur, phosphorus and/or oxygen as coordinating atoms to the metal, L is formed by reaction of the Group 4 or 6 or 8 or 9 or 10 metal complex and the free olefin groups of the polymer and NCA is a non-coordinating anion; $(Multidentate)MR_xL$, wherein M is a Group 4 or 6 or 8 or 9 or 10 metal, R is hydride, alkyl, silyl, germyl, aryl, halide or alkoxide group, x is an integer equal to 0, 1 or 2, multidenate is a bidentate, tridentate or tetradentate ligand containing nitrogen, sulfur, phosphorus and/or oxygen as coordinating atoms to the metal and L is formed by reaction of the Group 4 or 6 or 8 or 9 or 10 metal complex and the free olefin groups of the polymer; $(Cp^1)_x(Cp^2)_yMR_xL^+[NCA]^-$, wherein M is a lanthanide or an actinide metal, R is hydride, alkyl, silyl, germyl, aryl, halide, alkoxide, amide or solvent ligand, R may also be a bidentate ligand containing nitrogen, sulfur, phosphorus air/or oxygen, x=0–2, y=0–2, L is formed by reaction of the lanthanide or actinide metal complex and the free olefin groups of the polymer and NCA is a non-coordinating anion and combinations thereof.

5. A porous particulate composition comprising a matrix of at least one macroporous polymer having a plurality of free olefin groups selected from the group consisting of: divinylbenzene polymers, divinylbenzene copolymers, styrene/divinylbenzene copolymers, divinylbenzene resins, cross-linked divinylbenzene polymers, styrene/butadiene copolymers, styrene/isoprene copolymers, vinylsiloxane polymers, allylsiloxane polymers and combinations thereof; and at least one Ziegler-Natta catalyst, wherein the matrix is formed by reaction of the at least one Ziegler-Natta catalyst and the free olefin groups of the polymer.

6. The porous particulate composition according to claim 5, wherein the Ziegler-Natta catalyst comprises at least one titanium compound, at least one magnesium compound and at least one aluminum compound.

7. A porous particulate composition comprising a matrix of at least one macroporous polymer having a plurality of free olefin groups selected from the group consisting of: divinylbenzene polymers, divinylbenzene copolymers, styrene/divinylbenzene copolymers, divinylbenzene resins, cross-linked divinylbenzene polymers, styrene/butadiene copolymers, styrene/isoprene copolymers, vinylsiloxane polymers, allylsioxane polymers, and combinations thereof; and at least one catalyst further comprising at least one chromium compound and at least one silicon compound, wherein the matrix is formed by reaction of the at least one catalyst and the free olefin groups of the polymer.

* * * * *